(12) United States Patent
Cavan (10) Patent No.: US 7,227,984 B2
(45) Date of Patent: Jun. 5, 2007

(54) METHOD AND APPARATUS FOR IDENTIFYING DEFECTS IN A SUBSTRATE SURFACE BY USING DITHERING TO RECONSTRUCT UNDER-SAMPLED IMAGES

(75) Inventor: Daniel L. Cavan, Woodside, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 709 days.

(21) Appl. No.: 10/379,236

(22) Filed: Mar. 3, 2003

(65) Prior Publication Data

US 2004/0175028 A1  Sep. 9, 2004

(51) Int. Cl.
*G06K 9/00* (2006.01)
*G06K 9/32* (2006.01)
*G01N 21/00* (2006.01)

(52) U.S. Cl. ............ 382/145; 382/299; 356/237.1
(58) Field of Classification Search ........... 382/145, 382/379, 299; 356/237.1
See application file for complete search history.

(56) References Cited

U.S. PATENT DOCUMENTS

| | | | |
|---|---|---|---|
| 4,811,409 A | | 3/1989 | Cavan .................. 382/8 |
| 5,341,436 A | * | 8/1994 | Scott ................... 382/141 |
| 5,446,378 A | * | 8/1995 | Reich et al. ........... 324/238 |
| 5,657,402 A | * | 8/1997 | Bender et al. ......... 382/284 |
| 5,822,055 A | * | 10/1998 | Tsai et al. ............ 356/237.1 |
| 6,184,526 B1 | * | 2/2001 | Kohama et al. ........ 250/310 |
| 6,194,718 B1 | | 2/2001 | Dotan .................. 250/310 |
| 6,252,218 B1 | * | 6/2001 | Chou .................. 250/208.1 |
| 6,317,512 B1 | * | 11/2001 | Maeda et al. ........... 382/141 |
| 6,434,280 B1 | * | 8/2002 | Peleg et al. ............ 382/299 |
| 6,535,650 B1 | * | 3/2003 | Poulo et al. ............ 382/284 |
| 6,650,704 B1 | * | 11/2003 | Carlson et al. ....... 375/240.01 |
| 6,870,609 B2 | * | 3/2005 | Watkins et al. ....... 356/237.1 |
| 7,003,177 B1 | * | 2/2006 | Mendlovic et al. ..... 382/299 |
| 2002/0171825 A1 | * | 11/2002 | Krantz et al. ......... 356/237.1 |
| 2002/0191825 A1 | * | 12/2002 | Parekh et al. .......... 382/128 |

* cited by examiner

*Primary Examiner*—Joseph Mancuso
*Assistant Examiner*—Kathleen Yuan
(74) *Attorney, Agent, or Firm*—Beyer Weaver LLP (57) ABSTRACT

A surface inspection apparatus in accordance with the principles of the invention includes an optical system having a plurality of time delay integration (TDI) sensors. The plurality of TDI sensors are arranged to generate a plurality of images of an object so that the images are offset a sub-pixel distance from each other. A scanning element enables the TDI sensors to scan the object so successive images of the object can be generated. Image processing circuitry is used to process the plurality of successive images together to produce a reconstructed image of the object having increased pixel density. The embodiments of the invention also include methods for generating reconstructed images from a plurality of TDI images obtained from at least two offset TDI sensors.

5 Claims, 9 Drawing Sheets

METHOD AND APPARATUS FOR IDENTIFYING DEFECTS IN A SUBSTRATE SURFACE BY USING DITHERING TO RECONSTRUCT UNDER-SAMPLED IMAGES

TECHNICAL FIELD

The invention described herein relates generally to tools and methods used for conducting surface inspections. In particular, the invention relates to methods and apparatus using TDI (time delay integration) sensor imaging to identify defects in surfaces and substrates used in semiconductor processing. Such substrates can include, but are not limited to, mask reticles and semiconductor substrates.

BACKGROUND

For many years, various brightfield, darkfield, and e-beam scanning methodologies have been used to inspect surfaces. These scanning technologies make use of radiation scattered, diffracted, and/or reflected (collectively referred to herein as scattered) by a surface to characterize and examine features of the surface. The details of these and other related scanning and inspection technologies are well known to those having ordinary skill in the art.

In many of these type inspection tools, an object (commonly, a wafer or reticle) is secured to a movable stage and then a light beam is projected onto the object. The stage is controllably moved to permit the surface of the object to be scanned. As the surface of the object is scanned, an appropriately positioned time delay integration (TDI) sensor detects the light scattered from the surface. The TDI sensor generates signals corresponding to the detected light. These signals are then processed using a variety of different methodologies to detect defects.

Figure 1A:
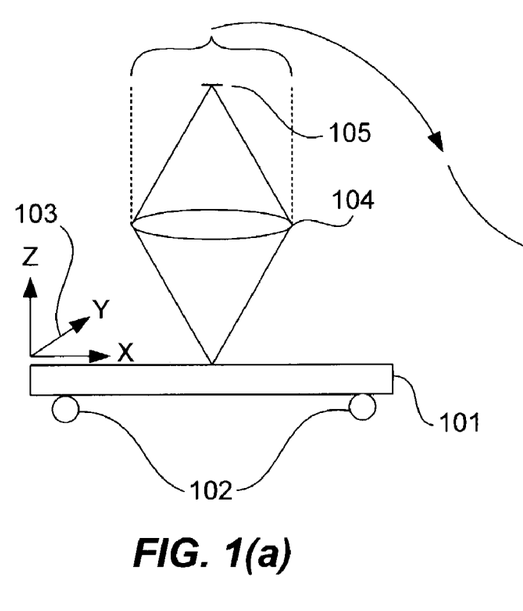
FIG. 1(a) depicts a simplified figurative side view of a conventional TDI surface inspection tool of a type known in the art.
Figure 1B:
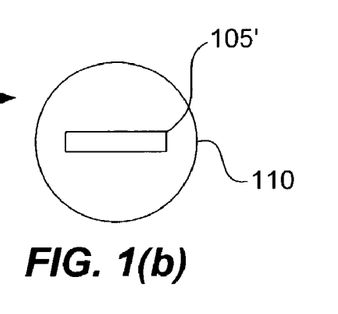
FIG. 1(b) depicts a field of view for the conventional TDI surface inspection tool depicted in FIG. 1(a).

FIG. 1(a) illustrates one conventional implementation of a bright-field surface inspection tool. An inspection surface 101 is mounted on a movable stage 102 in readiness for inspection. A focusing element 104 is positioned to receive light from the inspection surface 101. The focusing element 104 focuses light from the inspection surface 101 and forms a magnified image of the inspection surface 101, which is received by a TDI sensor 105. FIG. 1(b) schematically depicts the field of view 110 for the focusing element 104. The portion of the image surface 105' imaged by the TDI sensor 105 is also depicted.

Figure 1C:
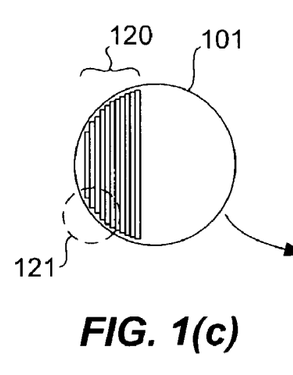
FIGS. 1(c) and 1(d) are simplified schematic depictions of an inspection surface showing a scanning pattern for a conventional TDI surface inspection tool of a type known in the art.

Referring again to FIG. 1(a), as the inspection surface 101 is scanned (for example along a y-axis, depicted by arrow 103), images are taken along a portion of the inspection surface. This portion of the inspection surface is referred to as a strip. As an inspection surface is scanned, a portion of the inspection surface as wide as the TDI sensor is scanned. By scanning adjacent strips of the surface, the entire inspection surface can be scanned. FIG. 1(c) depicts one scanning pattern used for scanning an inspection surface 101. A plurality of such strips 120 are scanned until images are collected for the entire inspection surface 101. The circled area 121 depicts a section of a scanned portion of the inspection surface 101.

Figure 1D:
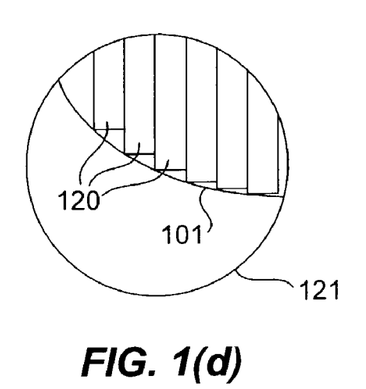

FIG. 1(d) is an expanded view of the area defined by circled area 121 of FIG. 1(c). In conventional implementations, the strips 120 are scanned in a carefully aligned non-overlapping manner such that the maximum area of the inspection surface 101 can be scanned in a minimum time. The width of the inspection surface 101 scanned by the strips 120 is determined by a variety of factors including, but not limited to TDI sensor size, system magnification, system resolution, as well as a number of other factors known to persons having ordinary skill in the art.

Figure 2A:
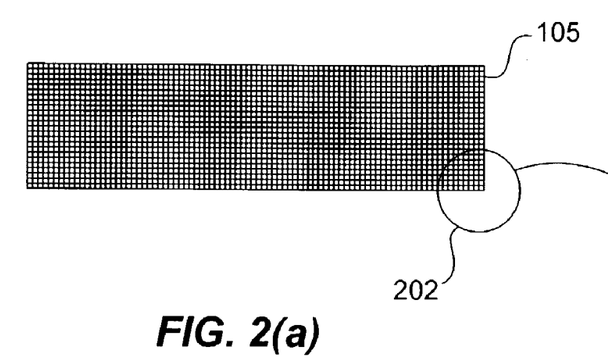
FIGS. 2(a) and 2(b) are simplified plan views of a conventional TDI sensor of a type known in the art.
Figure 2B:
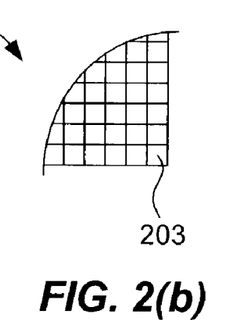

FIG. 2(a) depicts one type of TDI sensor 105 used in conventional inspection tools. The depicted sensor 105 comprises an array of photo sensor elements formed on a single chip. The circled portion 202 is depicted again in the expanded view of FIG. 2(b). In one conventional inspection system, the TDI sensor 105 comprises an array of charge coupled device (CCD) photo sensor elements 203. The photosensor elements 203 are used to generate image pixels. In one implementation, a TDI sensor 105 comprising an array of 2048×512 photosensor elements 203 can be used. In the depicted implementation, each photosensor element 203 is about 13μ (micron) by 13μ in size. Therefore, a the active region of a typical TDI sensor 105 is about 27 mm by 7 mm in size. Such TDI sensors typically have data rates in the hundreds (or thousands) of mega pixels per second (MPPS).

When coupled with the focusing element (e.g., 104 of FIG. 1(a)), the TDI sensor 105 can be used to create magnified images of an inspection surface. Typical inspection surfaces include images of mask reticles or semiconductor wafers as well as other surfaces. Using conventional inspection tools, the focusing element typically magnifies the inspection surface by about 100×. Using the previously described TDI sensor 105, under 100× magnification, each photosensor element 203 images a portion of the surface about 0.13μ square.

The resolving power of optical inspection tools can be characterized by the "point-spread-function" (PSF) of the tool. The PSF is affected by a number of factors including, but not limited to the optical quality of the lenses (or other optical elements) used in the focusing element, the wavelength of light, the NA of the lenses in the focusing element, as well as other factors.

Figure 3A:
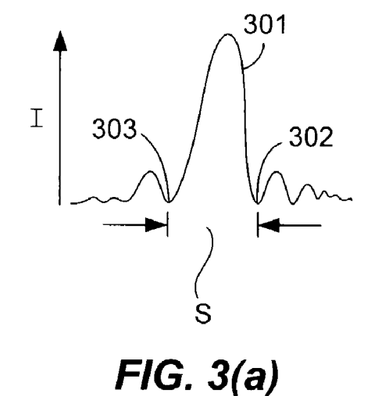
FIGS. 3(a) and 3(b) are simplified graphical depictions of point spread functions (PSF) used in characterizing optical performance of lens elements and pixel sampling in inspection tools.

In a conventional bright field inspection tool, the PSF can be depicted as shown in FIG. 3(a). FIG. 3(a) is a one-dimensional depiction of a typical PSF 301 plotted with respect to measured light intensity I. The distance between the two central minima 302 and 303 of the PSF 301 is defined as the spot size S. In order to obtain optical sensitivity commensurate with the optical resolution of the system an adequate number of image pixels must be used to span the spot size S. Where there are too few pixels per spot size S, the resulting images are said to be under-sampled. Such under-sampled images have reduced optical quality and have lower signal-to-noise ratios (SNR). Conversely, to achieve high sensitivity, a system designer ordinarily increases the optical magnification of the system or decreases the size of the photosensor elements of the TDI sensor arrays in order to achieve an adequate number of image pixels per spot size S. In order to obtain a desired sensitivity in a conventional inspection system there must be enough pixels per spot size to capture the full optical resolution possible with the system. Thus, in conventional systems, the system designer is faced with a difficult problem. He can, at high total system speed, generate images with an inadequate sampling ratio (too few pixels per PSF) resulting in images with relatively low SNR and/or decreased contrast. Alternatively, the sampling ratio can be increased (e.g., by increasing the optical magnification or decreasing the size of the photosensor elements in the TDI array) to better sample the optical image and thus improve the overall system sensitivity and signal to noise ratio. But, by increasing sampling ratio, the system is slowed down because an increasing the number of pixels must be processed. Moreover, an increased amount of time must be dedicated to acquiring these pixels. Additionally, increasing system magnification can be a very expensive proposition. Therefore, the designer is faced with a difficult tradeoff between system sensitivity and system throughput.

Figure 3B:
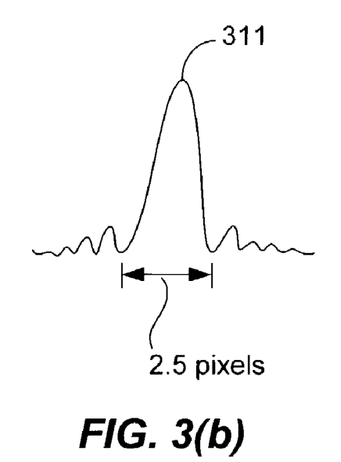

In conventional systems, a reasonable design compromise has been found using pixelization ratios (sampling ratios) of at least 2.5:1. This is shown in FIG. 3(b), which depicts a PSF 311 in one dimension. The depicted PSF 311 has a pixelization ratio of 2.5 image pixels per spot size S of the point spread function 311. PSF's digitized at pixelization ratios of less than 2.5 image pixels per spot size S are said to be under-sampled. In such conditions, small pixel to spot alignment differences between digitized images result in increased noise and lower system sensitivity. Thus, in conventional inspection tools, under-sampling typically results in dramatically reduced performance.

Although existing inspection machines and processes accomplish their designed purposes reasonably well, they have some limitations. There is a need for higher throughput and greater sensitivity than is currently provided by existing machines and processes. For these and other reasons, improved surface inspection tools and methodologies are needed.

SUMMARY OF THE INVENTION

In accordance with the principles of the present invention, an apparatus and method for forming reconstructed images with increased image pixel density is disclosed. The method and apparatus use two (or more) TDI sensors arranged to produce offset under-sampled images of an inspection surface that are processed together to form the reconstructed images.

In one embodiment, the invention comprises a surface inspection apparatus for generating a plurality of under-sampled images and processing those images together to produce a reconstructed image of an object. Such an apparatus can include an optical system having a plurality of time delay integration (TDI) sensors. The TDI sensors are arranged to generate a plurality of images of the object so that the images are offset a sub-pixel distance from each other. The apparatus further includes a scanning element that enables the TDI sensors to scan the object thereby generating a series of successive images of the object. Also, the apparatus includes image processing circuitry that processes the plurality of successive images together to produce a reconstructed image of the object having a higher image quality than any of the component images.

Another embodiment of the invention concerns a method of increasing the throughput of a surface inspection tool having an optical resolution characterized by a point spread function and a corresponding spot size. The method involves providing a surface inspection tool having a plurality of time delay integration (TDI) sensors suitable for generating images of an object. A plurality of successive under-sampled images of the object are generated in parallel, such that each image of the plurality of successive under-sampled images is offset a sub-pixel distance with respect to a preceding under-sampled image. The under-sampled images are processed together to produce a reconstructed image of the object such that the reconstructed image has a pixelization ratio greater that a pixelization ratio for the plurality of successive under-sampled images.

In another embodiment the invention comprises a method of increasing the sensitivity of surface inspection techniques using time delay integration (TDI) sensors. The method involves generating a plurality of successive images of an object such that each image of the plurality of successive images is offset a sub-pixel distance with respect to the preceding image. The images are processed together to produce a reconstructed image having higher image quality than one of the plurality of successive images.

These and other aspects of the present invention are described in greater detail in the detailed description of the drawings set forth hereinbelow.

BRIEF DESCRIPTION OF THE DRAWINGS

The following detailed description can be more readily understood in conjunction with the accompanying drawings, in which.

It is to be understood that, in the drawings, like reference numerals designate like structural elements. Also, it is understood that the depictions in the Figures are not necessarily to scale.

DETAILED DESCRIPTION OF THE DRAWINGS

The present invention has been particularly shown and described with respect to certain embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

As explained above, conventional inspection tools usually require that images be sampled at a pixelization ration of at least 2.5:1 (i.e., 2.5 image pixels per one spot size) in order to obtain adequate sensitivity for the inspection tool. In conventional tools under-sampled images result in reduced contrast, lower SNR's, and reduced sensitivity. These under-sampled images are also referred to as component images. However, the inventor has discovered that tremendous advantages can be obtained by using a plurality of offset under-sampled images to form reconstructed images. These reconstructed images can provide greater sensitivity than when compared systems designed to use only one of the individual component images. Thus, a multi-sensor embodiment of the present invention exhibits substantial advantages when compared with single sensor designs currently in use. In particular, multi-sensor embodiments of the present invention can obtain better image contrast as compared with single sensor designs currently in use. Moreover, the inventor has discovered that by using such under-sampled images, the throughput of inspection systems can be substantially increased without sacrificing sensitivity.

Figure 4A:
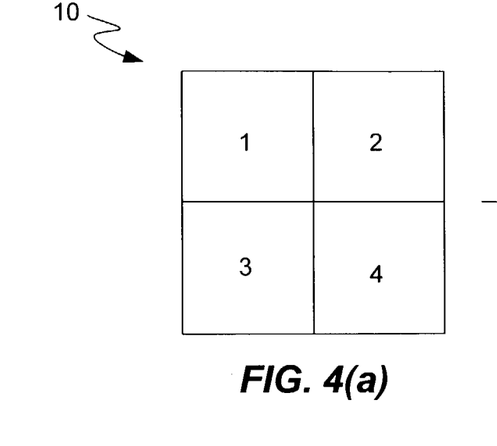
FIGS. 4(a) and 4(b) are depictions of a simplified TDI sensor and a corresponding image generated by the TDI sensor in accordance with the principles of the invention.

The following detailed description describes various method and apparatus embodiments for inspecting surfaces in accordance with the principles of the present invention. FIG. 4(a) is a depiction of a simplified TDI sensor 10 capable of practicing the invention. The depicted sensor 10 includes four photosensor elements 1, 2, 3, and 4. As explained hereinabove, the photosensor elements are commonly CCD sensor elements. The inventor contemplates that the embodiments of the invention can incorporate TDI sensors of a variety of sizes. However, one TDI sensor suitable for use with embodiments of the invention is schematically depicted in FIG. 2(a). One example of such a sensor comprises an array of 2048×96 image pixels with each image pixel being about 13µ (micron) by 13µ in size. Such a sensor is commonly available from many different manufacturers. One satisfactory sensor is an IT-F6-2048 available from DALSA Corporation of Waterloo, Ontario (Canada).

As is known to persons having ordinary skill in the art many other TDI sensors can be employed. Such TDI sensors typically have data rates on the order of hundreds or thousands of MPPS.

It should be noted that in prior art inspection tools, this data rate together with magnification from object to image plane, imposes certain limitations on the rate at which an inspection surface (e.g., a wafer or reticle) can be inspected. Embodiments of the present invention can substantially increase the inspection rate possible for such systems. This can be accomplished by reducing the required magnification of the system and through the contemporaneous use of two or more TDI sensors. As a result, embodiments of the present invention can be used to obtain higher throughput.

Figure 4B:
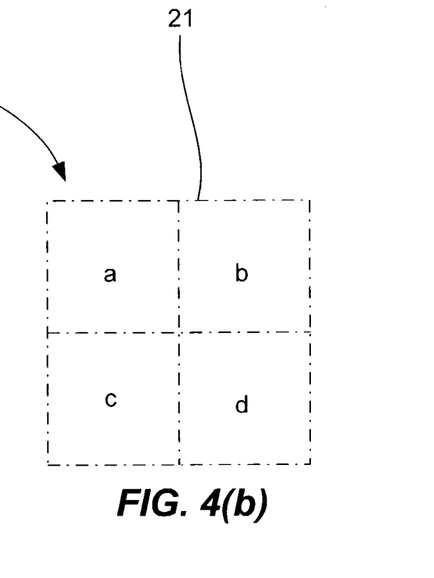

In most embodiments, radiation received from the inspection surface (e.g., scattered, diffracted, and reflected light) is captured by a TDI sensor 10 such as depicted in FIG. 4(a). A focusing element magnifies and focuses the received light until a desired magnification and resolution is obtained. Each photosensor element (e.g., 1, 2, 3, 4) corresponds to an object pixel on the surface of the object being inspected. As a surface to be inspected is scanned, the TDI sensor 10 generates a plurality of images that are associated with the surface being inspected. FIG. 4(b) illustrates one embodiment of such an image 21. The depicted image 21 includes a plurality of image pixels a, b, c, d. As explained above, if the system uses 100× magnification, each 13µ×13µ image pixel (e.g., a, b, c, d) corresponds to an object pixel about 0.13µ square on the object surface. In the depicted example, the image 21 comprises four image pixels a, b, c, d. Each image can be formed having a pixel density. As used herein, pixel density refers to the number of image pixels per unit area. Thus, the depicted image has a pixel density of four image pixels per 0.26µ by 0.26µ area. The principles of the present invention are directed to embodiments that can use a plurality of under-sampled images processed together to a reconstructed image having a higher pixel density. The details of such applications are discussed hereinbelow.

Figure 5:
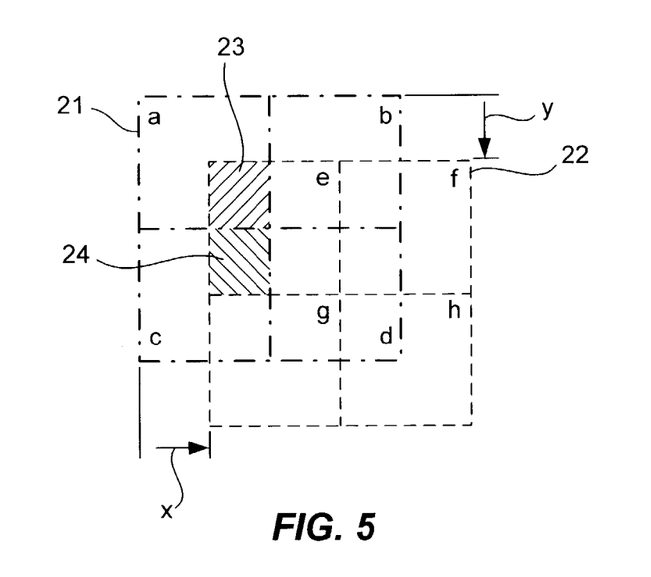
FIG. 5 depicts two offset images generated in accordance with the principles of the invention, superimposed over one another.

A basic implementation of the principles of the invention is illustrated with reference to the simplified embodiment depicted in FIG. 5. A first TDI sensor (for example, the sensor 10 depicted in FIG. 4(a)) is arranged to receive light from a surface to be inspected. This sensor generates a corresponding image depicted here as image 21 (depicted in alternating dotted and dashed line). In most implementations, the first sensor 10 will generate a stream of under-sampled images associated with the scanning pattern traced by the tool of the present invention on the inspection surface. A second TDI sensor (not shown here) generates a second under-sampled image 22 (having second image pixels e, f, g, h). The second TDI sensor is arranged such that it images a slightly different portion of the inspected surface relative to images generated by the first TDI sensor. The result is schematically illustrated in FIG. 5 where the second image 22 is superimposed over the first image 21. The second image 22 is offset by a sub-pixel distance with respect to the first image 21. In the depicted embodiment, the second image 22 is offset in the horizontal direction "x" by a sub-pixel distance with respect to the first image 21. Also, in the depicted embodiment, the second image 22 is offset a sub-pixel distance in the vertical direction "y" with respect to the first image 21. These under-sampled images (e.g., 21, 22) (sometimes referred to as component images) can be used to form a reconstructed image of the inspected surface. Additionally, by using these reconstructed images, an inspection system having greater sensitivity than systems designed to use either of the under-sampled component images 21, 22 can be constructed. In most embodiments, streams of successive images can be generated during scanning. As a result, each stream comprises a plurality of successive images. The streams generated by one sensor are offset with respect to streams generated by other sensors. These offset streams can be combined to generate a reconstructed image of an object.

With continued reference to FIG. 5, an embodiment for using a plurality of offset images to generate reconstructed images of an inspection surface having greater sensitivity in accordance with the principles of the invention is now described. One method of image reconstruction uses "dithering" techniques. A related technique is frequently used to enhance the quality of astronomical photographs taken with telescopes. Types of dithering are used, for example, to produce high-resolution images for the Hubble Space Telescope. Dithering techniques, as applied to telescopes, are well understood by those having ordinary skill in the art. Such techniques are described in detail in numerous publications. For example, "Combining Undersampled Dithered Images", T. R. Lauer (February 1999) PASP, 111, 227-237, Electronic Journal Article accessible at: http://wwwjournals.uchicago.edu/PASP. Which is hereby incorporated by reference.

With continued reference to FIG. 5, a simplified description of a dithering technique suitable for use with the bright field inspection tools of the present invention is discussed. The two offset under-sampled images 21, 22 are depicted in superimposed configuration to illustrate how dithering may be applied to the embodiments of the invention. It is noted that the image pixels of the two under-sampled images 21, 22 are not aligned. It is important that the images are not aligned because aligned images would merely provide duplicative information and not provide suitable information for reconstructing images having increased sensitivity. However, by arranging the images in offset configuration the information from each of the component images can be processed together to obtain a resulting reconstructed image having a higher image pixel density and increased sensitivity when compared to the component images. Moreover, the reconstructed image will have an increased pixelization ratio as compared to the under-sampled component images 21, 22. This is extremely advantageous in that it enables groups of offset under-sampled images to be combined into reconstructed images having increased sampling. Such reconstructed images are said to have higher image quality than any of the component under-sampled images out of which they are constructed. As a result, a system that creates such reconstructed images from under-sampled images can obtain image sensitivity commensurate with the optical resolution of the system. Another powerful advantage realized by the embodiments of the invention is that increased throughput can be achieved by using a plurality of TDI sensors in parallel operation. This advantage will be discussed below.

In one embodiment, the increased pixelization ratio and increased image pixel density is accomplished as described below. As previously explained, the under-sampled images 21, 22 of the depicted embodiment are offset a sub-pixel distance in the horizontal direction x and a sub-pixel distance in the vertical direction y. In the depicted embodiment, the offset is ½ pixel in the vertical direction and ½ pixel in the horizontal direction. By using dither processing, greater resolution can be obtained in reconstructed images. For example, an intensity value can be determined for a region where an image pixel "a" of the first image 21 and an image pixel "e" of the second image 22 overlap. The two image pixels a and e are then processed to obtain an estimated light intensity value for a reconstructed image pixel (depicted here as area 23). This can be mathematically, for example, using the following equation:

$$\frac{I_{1N} + I_{2M}}{4} = I_R$$

where $I_{1N}$ refers to the light intensity of the Nth image pixel in the first image;

where $I_{2M}$ refers to the light intensity of the Mth image pixel in the second image;

where $I_R$ refers to the estimated light intensity of the reconstructed image pixel; and where the Mth image pixel in the second image overlaps the Nth image pixel in the first image.

Continuing, the estimated intensity of another reconstructed image pixel 24 can be calculated using the intensity value for image pixel "c" of the first image 21 and the intensity value for image pixel "e" of the second image 22. This general process is continued, until a reconstructed image is generated for all desired portions of the object being inspected. During scanning, a plurality of successive images are generated by the first sensor and also generated by the second sensor. The plurality of first images are processed with the offset plurality of second images to generate a reconstructed image for the object being inspected.

In the embodiment of FIG. 5, the inspection surface is magnified 100×. Thus, the image pixels (a, b, c, d, e, f, g, and h) each correspond to a 0.13µ square area of the object being inspected. Dithering can be used to obtain increased pixel density. For example, if image pixel "a" of the first image 21 and image pixel "e" of the second image 22 each correspond to a 0.13µ square area of the object being inspected, then by using dithering the reconstructed pixel 23 represents an about 0.065µ square area of the object being inspected. Thus, two TDI sensors can be used to obtain four times the pixel density obtained using one TDI sensor at the same magnification. This advantage is especially significant when one considers that this increase in pixel density is obtained without any significant change to the underlying optics. No increase in magnification is required, no increase in lens quality (e.g., PSF) is required, and under-sampled images can be used to generate reconstructed images having increased pixelization ratios and increased sensitivity.

Another significant advantage realized by some embodiments of the invention is that by using lower magnification, larger areas of the inspection surface can be imaged at the same time while still retaining the same pixel density. In addition, the plurality of TDI sensors are all collecting data simultaneously (i.e., the sensors are in parallel operation). This has a tremendous impact on throughput. In the previous example, 100× magnification was used. By reducing the magnification to, for example, 70×, each image pixel is now under-sampled, but corresponds to a larger area of the inspection surface. Thus, the entire surface can be scanned faster. However, through image reconstruction, the sampling ratio of the reconstructed image can be increased relative to any of the component images thereby maintaining image quality. Thus, offset under-sampled component images can be combined to form reconstructed images having a higher pixelization ratio and higher pixel density that the component images. One advantage of such an embodiment is that, by reducing the magnification, larger areas of the surface can be imaged at the same time, thereby examining greater amounts of wafer surface area per unit of time. As a result, the objects being inspected can be scanned faster, resulting in much higher throughput for embodiments constructed in accordance with the principles of the invention. In one example, using two sensors, about twice the throughput can be achieved. Second, reduced magnification can be used to reduce the cost of inspection tools constructed in accordance with the principles of the invention.

Additional details of such dithering techniques are discussed in many articles, for example, the above-referenced article "Combining Undersampled Dithered Images" by T. R. Lauer (1999).

As previously discussed, conventional systems have a required pixelization ratio of 2.5 image pixels per spot size of a PSF in order to have sufficiently reliable image quality. Using two or more under-sampled images, this limitation is substantially reduced. In short, two or more images having pixelization ratios of less than 2.5 pixels per spot size can be combined to form a reconstructed image having higher pixel density and an increased pixelization ratio per spot size than any of the under-sampled component images. In preferred embodiments, the under-sampled images are sampled at pixelization ratios of less than 2.5 image pixels per spot size. Although the exact lower end for sampling ratios is highly dependent on the number of sensors used, in general, under-sampled component images can be sampled at pixelization ratios of between about 1 to 2.5 image pixels per spot size. Additionally, as the number of TDI sensors used increases, the pixelization ratios required for the component under-sampled images is reduced. For example, in a two-sensor implementation, the under-sampled images are preferably sampled at about 1.77 (or more) ($2.5/\sqrt{2}$) pixels per spot size. In another example, in a four-sensor implementation, the under-sampled images are preferably sampled at least about 1.25 pixels per spot size.

Figure 6A:
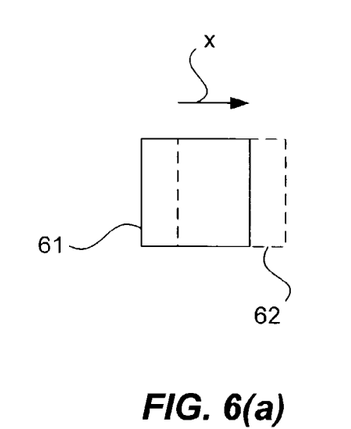
FIGS. 6(a)-6(d) are figurative illustrations that depict pixel offset in accordance with the principles of the present invention.
Figure 6B:
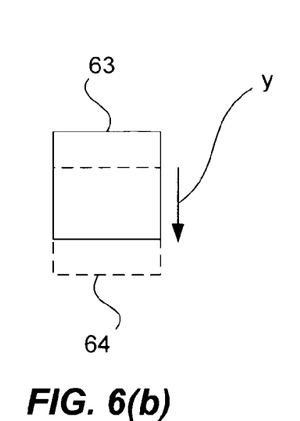
Figure 6C:
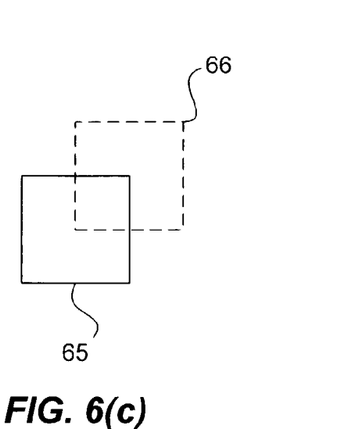

FIGS. 6(a)-6(c) schematically illustrate some alternative embodiments for applying at least two offset images to generate higher resolution images. In one application, the offset can be in just one direction. For example, in FIG. 6(a) the second image 62 is offset a sub-pixel distance in the horizontal direction x relative to a first image 61. Similarly, in FIG. 6(b) a second image 64 is offset a sub-pixel distance in the vertical direction y relative to a first image 63. A sub-pixel distance offset is defined as an offset between a first image and a second image where the offset is less than the size of an image pixel. In a stream of images, each image from one set of images produced by one TDI sensor is offset with respect to another set of images produced by another TDI sensor. As will be discussed later, this concept can be extended to configurations that include more than two TDI sensors and generate more than two image streams as the inspection surface is scanned. Such embodiments will be described in greater detail herein below.

In most embodiments of the present invention, the preferred horizontal or vertical offset distance is ½ of an image pixel. Therefore, using TDI sensors having, for example, 13μ×13μ image pixels, a preferred offset distance is about 6.5μ. The only limitation is two TDI sensors must be positioned so that the images generated by a first TDI sensor do not coincide with the images generated by the second pixel sensor. For example, an offset of 0.3 or 0.25 pixels is suitable. However, an offset of any integer number of pixels (e.g., 1, 2, 10, or 50 pixels) will not be suitable.

Figure 6D:
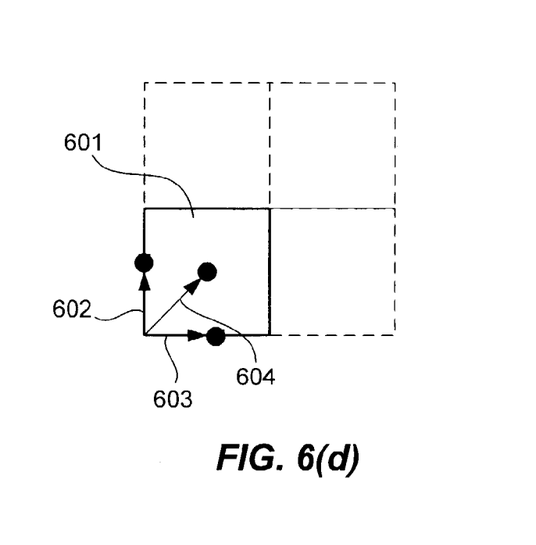

Additionally, the inventors contemplate embodiments using more than two TDI sensors. Such embodiments can achieve higher throughput, higher pixelization ratios, higher pixel density, and therefore higher sensitivity. Embodiments integrating more than two images can be dithered together to create reconstructed images of very high sensitivity. FIG. 6(d) is a schematic illustration of one embodiment using four images to reconstruct a higher resolution image. The depicted dots each represent the lower left corner of an under-sampled image. A first image 601 is generated with a TDI sensor. Also, second, third, and fourth TDI sensors generate a second image, a third image, and a fourth image, respectively. The second image is offset a sub-pixel distance in a vertical direction (indicated by arrow 602) relative to the first image 601. The third image is offset a sub-pixel distance in a horizontal direction (indicated by arrow 603) relative to the first image 601. And the fourth image is offset a sub-pixel distance in a horizontal direction and a vertical direction (indicated by arrow 604) relative to the first image 601. These four images can be dithered together to obtain a reconstructed image having higher resolution than the first, second, third, and fourth images.

In addition to dithering, the inventor contemplates other signal processing approaches for reconstructing higher resolution images from a plurality of lower resolution images. For example, another suitable technique known to persons having ordinary skill in the art is referred to as "drizzling". Such drizzling techniques are sometimes used in astrophotography to reconstruct high resolution images from lower quality images. Numerous references discuss such techniques. For example, a drizzle approach is discussed in "Drizzle: A Method for the Linear Reconstruction of Undersampled Images", Fruchter, A. S., Hook, R. N which is hereby incorporated by reference. Other examples include image averaging and other related image processing techniques.

This forgoing approaches can be applied to both darkfield and brightfield inspection techniques. However, the preferred implementation is a brightfield inspection tool using an incoherent light source.

Figure 7A:
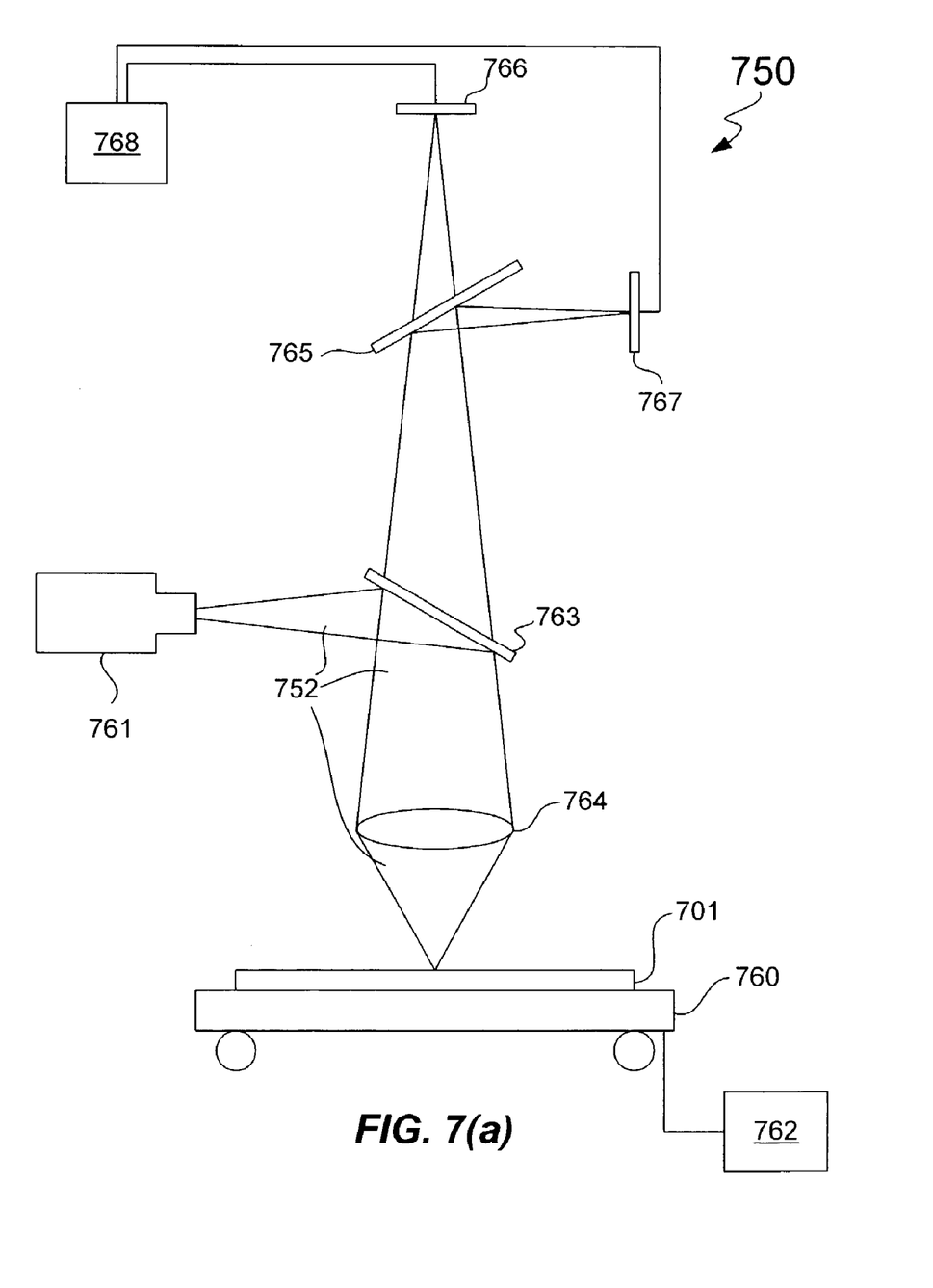
FIGS. 7(a), 7(b), and 7(c) are simplified figurative side views of various types of inspection tool embodiments constructed in accordance with the principles of the present invention.

FIG. 7(a) schematically depicts one simplified embodiment of a brightfield inspection tool 750 constructed in accordance with the principles of the invention. An object 701 to be inspected is positioned in the tool 750. The object 701 can be arranged on a movable stage 760 or any other type of support structure commonly used in such inspection tools. During scanning, the stage 760 is moved by a scanning control element 762. In alternative embodiments, the scanning control element 762 can be used to move other elements of the inspection tool 750 in order to effectuate scanning of the desired portions of the object 701 being inspected. The object 701 is illuminated by suitably situated illumination source that can create bright filed illumination effects. One such embodiment is depicted as illumination source 761. Typically, the source 761 produces an incoherent light beam 752 (e.g., an ultraviolet (UV) light beam). The light beam 752 is directed onto the object 701 to be inspected. This can be accomplished by a number of methods known to persons having ordinary skill in the art. In the depicted example, the beam 752 is directed onto partially transmissive reflector 763 that directs the beam 752 downward into a focusing optic 764. The focusing optic 764 can include combinations of lenses, reflectors, collimators, apertures, and many other types of optical elements. The light beam 752 passes through the focusing optic 764 and onto the object 701. Portions of the light beam 752 are reflected, scattered, and diffracted by the object 701. A portion of the light from the object 701 is captured by the focusing optic 764 as it passes upward from the object 701. The focusing optic 764 is used to adjust the magnification, focus, resolution, and other optical properties of the system in order to enhance the tools inspection characteristics.

In accordance with the principles of the invention, as the object 701 is scanned, light from the object 701 passes back through the focusing optic 764 and back through the partially transmissive reflector 763 where it is directed onto a beam splitting optic 765. Such beam splitting optics 765 can comprise a single beam splitter or arrangements of many beam-splitting elements arranged to split the light received from the focusing optic 764. In the depicted embodiment, a simple 50/50 beam splitter is used. A portion of the light passes through the beam splitting optic 765 and is detected by a first TDI sensor 766. Another portion of the light is reflected by the beam splitting optic 765 onto a second TDI sensor 767 where it is detected. The beam splitting optic 765, the first TDI sensor 766, and the second TDI sensor 767 are all arranged so that images generated by the second TDI sensor 767 during scanning are offset with respect to images produced by the first TDI sensor 766. The TDI sensors 766, 767 produce electronic signals that correspond to the time, position, and intensity of light received by the TDI sensors 766, 767. These signals are received by electronic processing circuitry 768, which processes the signals to generate reconstructed images having higher resolution than those produced by the individual TDI sensors. Such processing circuitry typically includes and image processor, but can also include, without limitation, data storage, data comparison, data analysis, image reconstruction, and a number of other processing functions well known to persons having ordinary skill in the art. Suitable, electronic processing circuitry 768 includes, but is not limited to, digital devices such as programmable logic devices, ASIC's, or DSP's. This enables the offset images received by the TDI sensors 766, 767 to be processed and integrated to generate reconstructed images as discussed herein above. It is contemplated by the inventor that more than two TDI sensors can be used to generate offset images of the object being inspected.

Figure 7B:
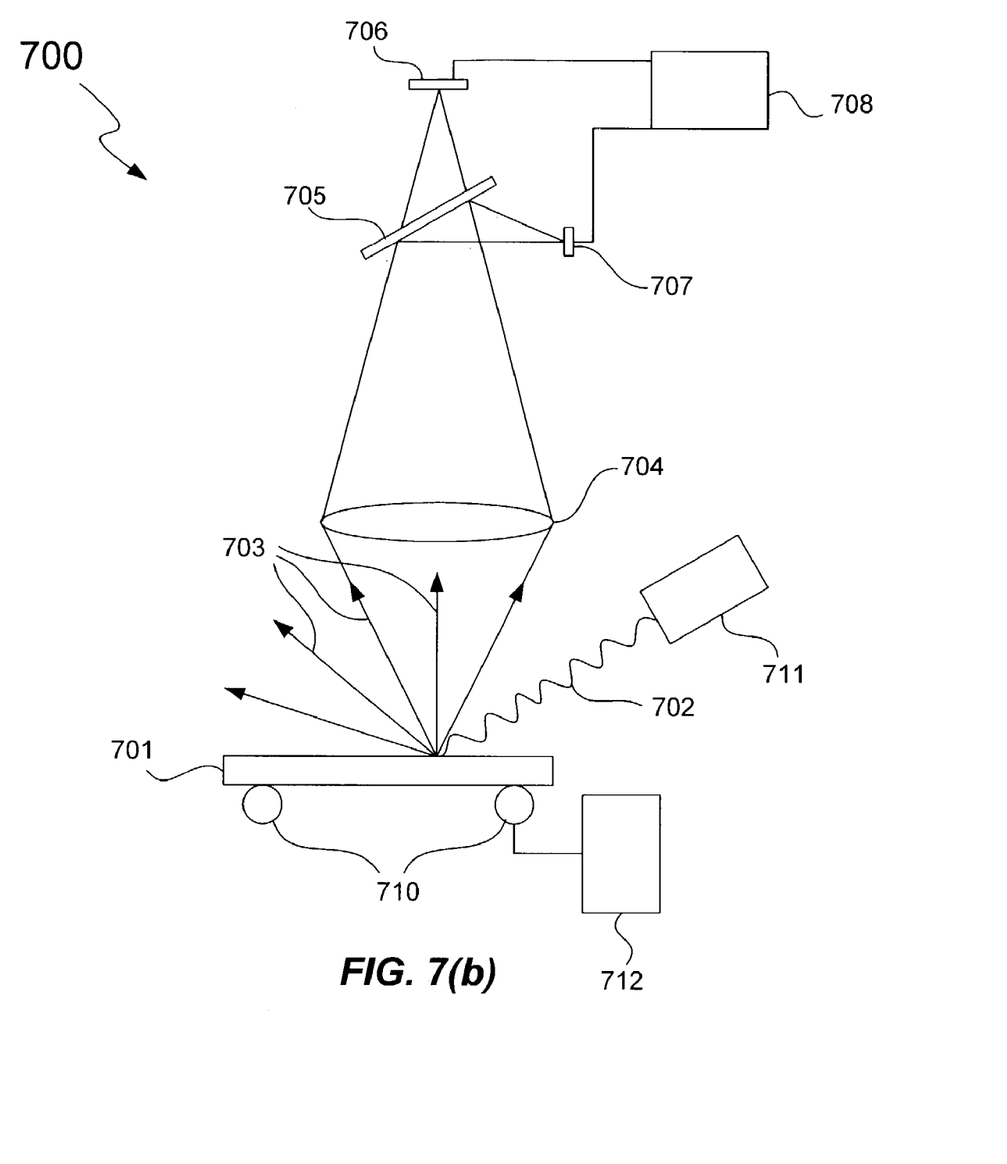

FIG. 7(b) schematically depicts a simplified embodiment of a darkfield inspection tool 700 constructed in accordance with the principles of the invention. An object 701 to be inspected is positioned in the tool 700. The object 701 can be arranged on a movable stage 710 or any other type of support structure commonly used in such inspection tools. During scanning, the stage 710 is moved by a scanning control element 712. In alternative embodiments, the scanning control element 712 can be used to move other elements of the inspection tool 700 in order to effectuate scanning of the desired portions of the object 701 being inspected. The object 701 is illuminated by an illumination source 711. Typically, the source 711 is a laser that produces a light beam 702 (e.g., an ultraviolet (UV) laser beam). The light beam 702 is directed onto the object 701 to be inspected. Portions of the light beam 702 are reflected, scattered, and diffracted by the object 701 as beams 703. A portion of the light from the beams 703 is received by a focusing optic 704. The focusing optic 704 can include combinations of lenses, reflectors, collimators, apertures, and many other types of optical elements. The focusing optic 704 is used to adjust the magnification, focus, resolution, and other optical properties of the system in order to enhance the tools inspection characteristics.

In accordance with the principles of the invention, as the object 701 is scanned, light (e.g., 703) from the object 701 passes through the focusing optic 704 where it is split by a beam splitting optic 705. Such beam splitting optics 705 can comprise a single beam splitter or arrangements of many beam-splitting elements arranged to split the light from the focusing optic 704. In the depicted embodiment, a simple 50/50 beam splitter is used. A portion of the light passes through the beam splitting optic 705 where it is detected by a first TDI sensor 706. Another portion of the light is reflected by the beam splitting optic 705 onto a second TDI sensor 707 that detects the incident light. The beam splitting optic 705, the first TDI sensor 706, and the second TDI sensor 707 are all arranged so that images generated by the second TDI sensor 707 during scanning are offset with respect to images produced by the first TDI sensor 706. The TDI sensors 706, 707 produce electronic signals that correspond to the time, position, and intensity of light received by the TDI sensors 706, 707. These signals are received by electronic processing circuitry 708, which processes the signals to generate reconstructed images having higher resolution than those produced by the individual TDI sensors. Typically, the processing circuitry 708 comprises an image processor, but can also include, without limitation, data storage, data comparison, data analysis, image reconstruction, and a number of other processing functions well known to persons having ordinary skill in the art. Suitable, electronic processing circuitry 708 includes, but is not limited to, digital devices such as programmable logic devices, ASIC's, or DSP's. This enables the offset images received by the TDI sensors 706, 707 to be processed and integrated to generate high resolution reconstructed images as discussed herein above. It is contemplated by the inventor that more than two TDI sensors can be used to generate offset images of the object being inspected.

Figure 7C:
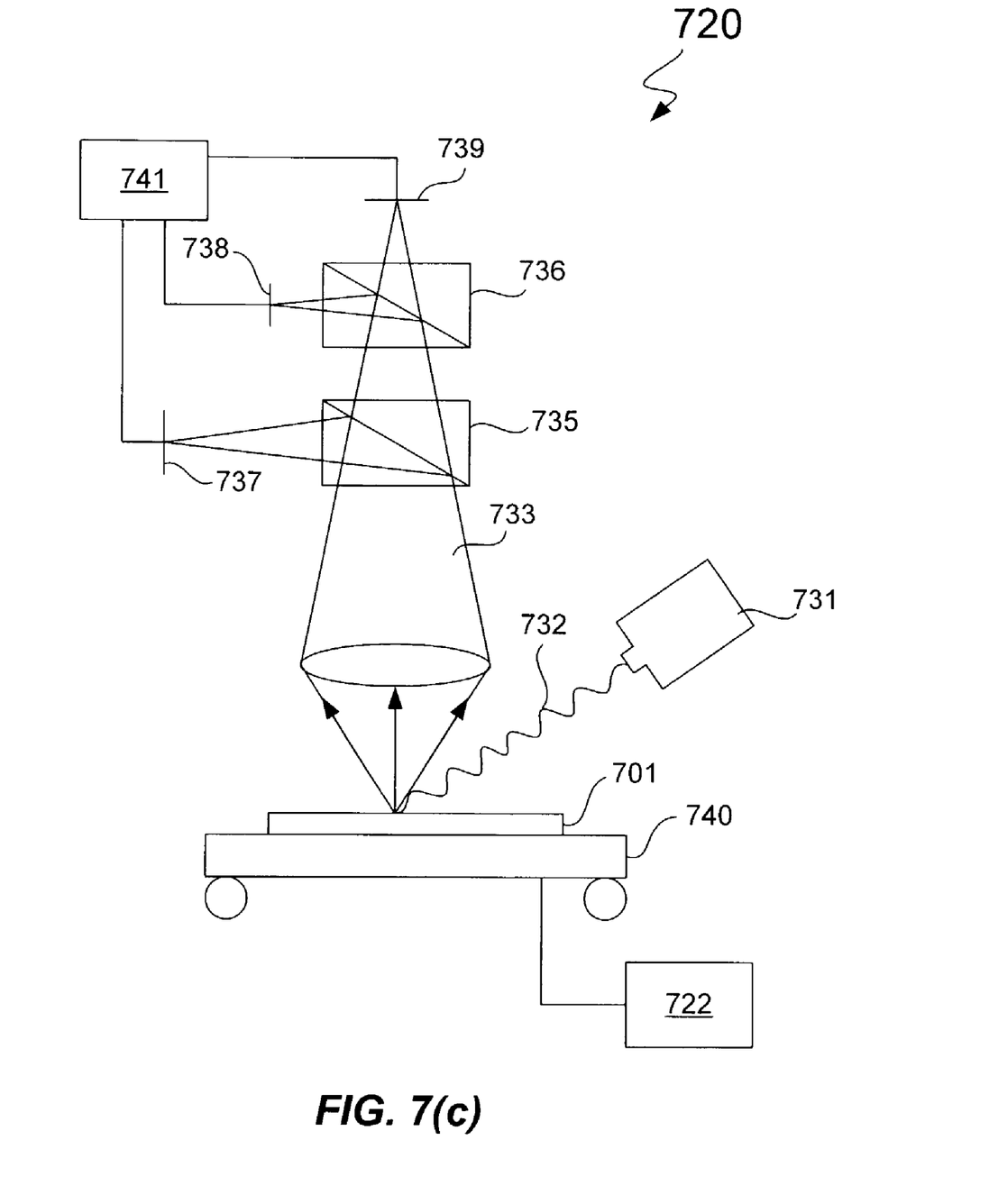

FIG. 7(c) schematically depicts another simplified embodiment of another TDI sensor configuration in an inspection tool 720 constructed in accordance with the principles of the invention. An object 701 to be inspected is arranged on a movable stage 740 or other movable support. As with the foregoing embodiment, a scanning control element 722 controls the scanning movement of the object 701 being scanned. In alternative embodiments, the scanning control element 722 can be used to move other elements of the inspection tool 720 in order to effectuate scanning of the desired portions of the object 701 being inspected. The object 701 is illuminated by an illumination source 731. As with the previously described embodiments the source 731 directs a light beam 732 onto the inspection surface (object 701). A focusing optic 734 receives the light 733 from the object 701 being inspected. As with the previously described embodiment, the focusing optic 704 can include combinations of lenses, reflectors, collimators, apertures, and many other types of optical elements that function as previously described.

Light 733 exiting the focusing optic 734 is directed onto a plurality of beam splitters 735, 736 that direct portions of the light onto a plurality of TDI sensors 737, 738, 739. The beam splitters 735, 736 and TDI sensors 737, 738, 739 are arranged so that each TDI sensor images a portion of the object 701 that is offset with respect to the portions of the object 701 imaged by the other TDI sensors. It is important that each of the TDI sensors 737, 738, 739 is at the same distance from the focusing optic 734.

With continued reference to FIG. 7(c), light 733 from the object 701 passes through the focusing optic 734 onto a first beam splitter 735. In the depicted embodiment, the first beam splitter 735 reflects ⅓ of the light 733 onto a first TDI sensor 737 and transmits ⅔ of the light 733 onto the second beam splitter 736. Light transmitted by the first beam splitter 735 is directed onto the second beam splitter 736, which is typically a 50/50 beam splitter. The portion of the light that passes through the second beam splitter 736 is detected by a third TDI sensor 739. The second beam splitter 736 also reflects a portion of the light onto a second TDI sensor 738. As explained, the first beam splitter 735, second beam splitter 736, and the first TDI sensor 737, the second TDI sensor 738, and the third TDI sensor 739 are all arranged so that the plurality images generated by the TDI sensors 737, 738, 739 are all offset with respect to each other.

The TDI sensors 737, 738, 739 produce electronic signals that are received by electronic processing circuitry 741. The electronic processing circuitry 741 processes the signals to generate high resolution reconstructed images. As with the previous embodiment, the electronic processing circuitry 741 can include, but is not limited to, digital devices such as programmable logic devices, ASIC's, or DSP's. It is further contemplated by the inventor that embodiments including four or more TDI sensors can be used to generate offset images of the object being inspected that can be used to generate reconstructed images having higher resolution.

Figure 7D:
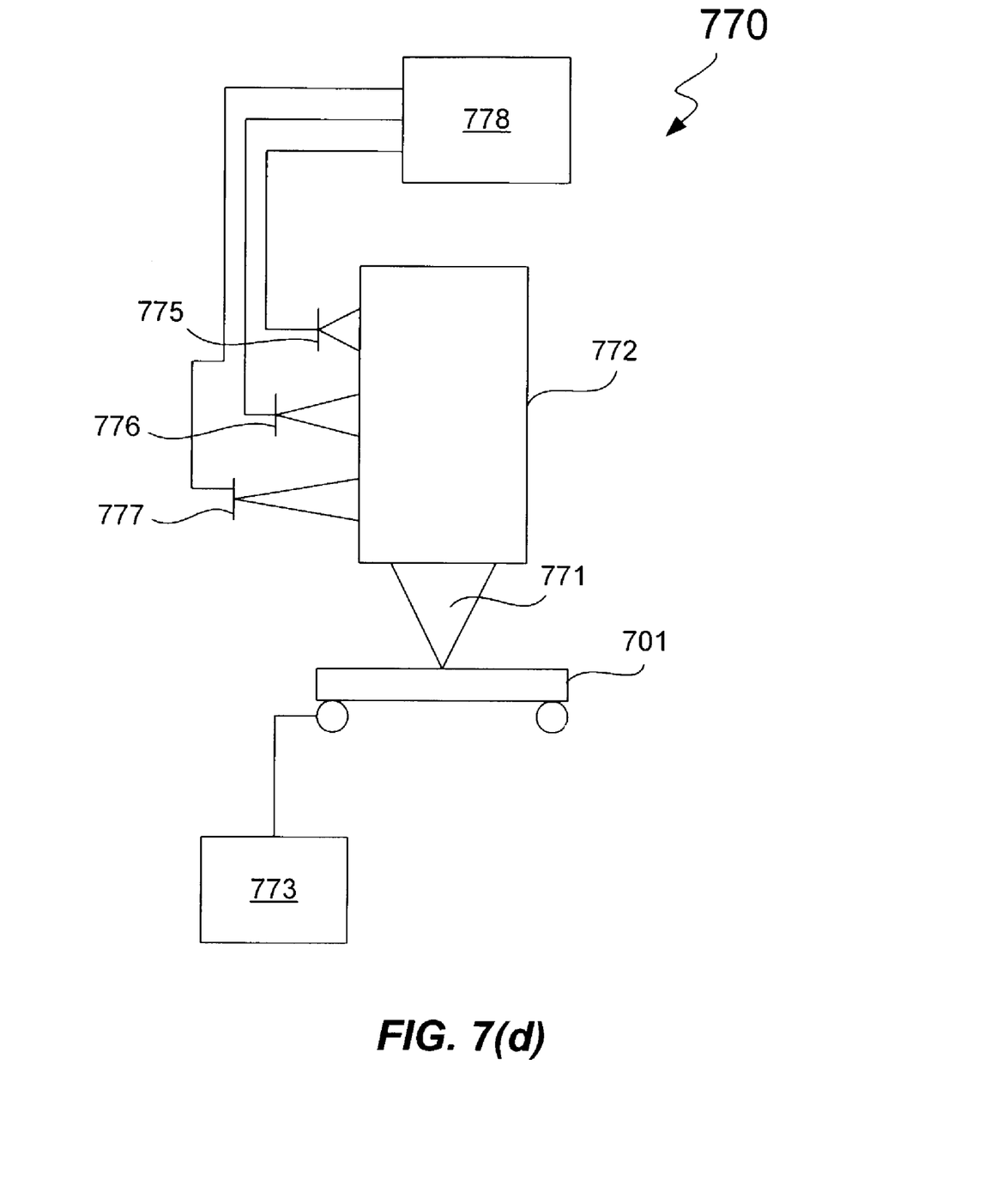
FIG. 7(d) is a simplified block depiction of a generalized embodiment for an inspection tool constructed in accordance with the principles of the present invention.

FIG. 7(d) depicts a very generalized approach for an inspection tool 770 and methodology in accordance with the principles of the invention. The inspection surface 701 is illuminated in accordance with any standard illumination technique known to persons having ordinary skill in the art (e.g., darkfield, brightfield or other related techniques). The tool 770 also typically includes scanning apparatus 773 that permits any desired portion of the surface 701 to be illuminated and inspected. Such scanning and illumination apparatus and methodologies are known to persons having ordinary skill in the art (typical examples are described elsewhere in this specification). Light 771 from the surface 701 (reflected, scattered, diffracted, etc.) is received by an optical system 772. The optical system 771 is configured to receive light from the surface 701 and direct portions of the light onto a plurality of TDI sensors 775, 776, 777 that are arranged so that the surface images formed by each of the TDI sensors 775, 776, 777 are offset some sub-pixel distance from each other (typical examples of such arrangements are described elsewhere in the specification). Typically, optical system 771 includes a plurality of optical elements (e.g., objective lens systems, magnification elements, beam splitters, and other optical elements) arranged so that each of the TDI sensors 775, 776, 777 can form a component image of the surface 701 that is offset a sub-pixel distance with respect to the other component images formed by other TDI sensors. These images are transmitted as electronic signals to an image processor 778 capable of a wide range of signal and image processing operations. In particular, the image processor 778 can be capable of image storage, image processing and reconstruction, as well as locating, quantifying, and categorizing defects located in the surface 701.

It is pointed out that the above-disclosed embodiments, as well as other related embodiments, can be used to increase the throughput obtained in surface inspection tools (e.g., brightfield and darkfield inspection tools). Although not limited to such, embodiments using two, three and four TDI sensors are especially suited to such applications.

In yet another implementation of the principles of the invention, specifically constructed interlaced TDI sensors can be used to obviate the need for beam splitters. Such an interlaced TDI sensor includes two (or in some embodiments more) offset TDI sensor arrays formed on a single substrate (chip). Additionally, a plurality of interlaced TDI sensors can be used in combination with beam splitters to generate offset images that can be used to reconstruct high-resolution images.

Figure 8:
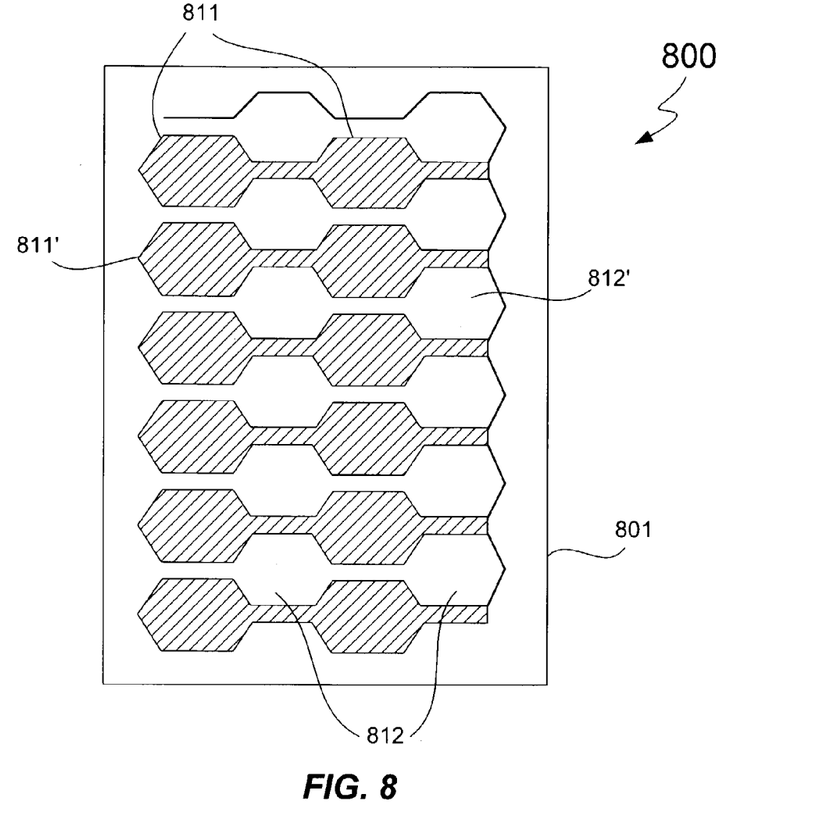
FIG. 8 is a depiction of a simplified interlaced TDI sensor embodiment constructed in accordance with the principles of the invention.

Referring to FIG. 8, a simplified depiction of one simplified embodiment of an interlaced TDI sensor 800 is depicted. Such a sensor 800 is typically fabricated on a semiconductor substrate 801. The depicted interlaced TDI sensor 800 includes two TDI sensor arrays formed on a single substrate (chip) 801. The two sensor arrays are arranged so that the pixel elements are offset with respect to each other. In the depicted embodiment, a first TDI sensor array 811 (shown here by the shaded hexagons) includes a plurality of rows and columns of individual hexagon-shaped TDI sensor elements (or pixels) 811' configured as a single TDI sensor array. A second TDI sensor array 812 (shown here by the un-shaded hexagons) includes another plurality of rows and columns of individual hexagon-shaped TDI sensor elements (or pixels) 812' configured as a second single TDI sensor array 812. Thus, the pixel elements of one sensor are interlaced with respect to the pixel elements of another sensor formed on the same substrate. The depicted interlaced TDI sensor 800 is configured such that the pixels 811' of the first TDI sensor array 811 are offset both in the vertical direction and in the horizontal direction relative to the pixels 812' of the second TDI sensor array 812. In various embodiments, the offset can be configured to accommodate the needs of the sensor design. Additionally, the sensor is not confined to the depicted hexagonal shape. The hexagonal sensors can be more elongate than the ones depicted. Additionally, different configurations of rows and columns can be implemented. Also, many other sensor shapes (e.g., diamond shapes, squares, triangles, etc.) arranged in varying configurations and/or with varying offsets are also contemplated.

Figure 9:
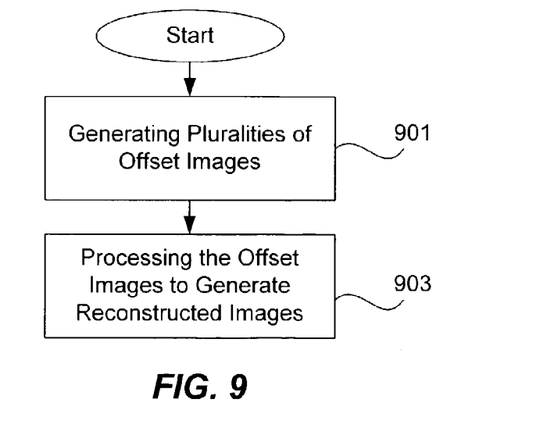
FIG. 9 is a flow diagram illustrating one embodiment of a process for inspecting a surface of an inspection surface in accordance with the principles of the present invention.

The above-described embodiments can implement methods for increasing the sensitivity and throughput of surface inspection techniques. FIG. 9 is a flow diagram illustrating a method of using a plurality of offset images generated by a plurality TDI sensors arranged to generate reconstructed images of an object. In one method embodiment, a plurality of successive images of the object are taken such that each image of the plurality of successive images is offset a sub-pixel distance with respect to the preceding image (Step 901). This can be achieved a number of ways. For example, TDI sensors can be arranged so that they image different portions of the object surface that are offset a particular distance from each other. This offset results in an overlapping plurality of under-sampled images that can be integrated to form a reconstructed image having an adequate pixelization ratio (e.g., a reconstructed image having a pixelization ratio of greater than about 2.5 pixels per spot size). In another alternative, by controlling the scanning rates the TDI sensors can generate offset images that can be used in a similar fashion. These and other techniques can be used to generate two (or more) offset pluralities of successive under-sampled images that can be used to practice the principles of the invention. The under-sampled images are then processed together to produce a high-resolution reconstructed image of the object such that the reconstructed image has a higher pixelization ratio than one of the plurality of successive images (Step 903). Many techniques of image reconstruction can be used. This includes, but is not limited to, dithering, drizzling, averaging, or other suitable techniques known to persons having ordinary skill in the art.

The present invention has been particularly shown and described with respect to certain preferred embodiments and specific features thereof. However, it should be noted that the above-described embodiments are intended to describe the principles of the invention, not limit its scope. Therefore, as is readily apparent to those of ordinary skill in the art, various changes and modifications in form and detail may be made without departing from the spirit and scope of the invention as set forth in the appended claims. In particular, it is contemplated by the inventors that embodiments using a wide range of pixel offsets are within the scope of this patent. Also, embodiments using many (including two, three, four or more) TDI sensors are within the scope of this patent. Further, reference in the claims to an element in the singular is not intended to mean "one and only one" unless explicitly stated, but rather, "one or more". Furthermore, the embodiments illustratively disclosed herein can be practiced without any element which is not specifically disclosed herein.

I claim:

1. A method of increasing the sensitivity of surface inspection techniques using time delay integration (TDI) sensor arrays, the method comprising:

generating a plurality of successive images of an object such that each image of the plurality of successive images is offset a sub-pixel distance with respect to the preceding image, wherein the plurality of successive images comprise undersampled images;

generating a first plurality of undersampled successive images of the object with a first TDI sensor array having a plurality of CCD sensor elements;

generating a second plurality of undersampled successive images of the object with a second TDI sensor array having a plurality of CCD sensor elements such that each image of the second plurality of successive images is offset a sub-pixel distance with respect to the preceding image of the first plurality of successive images;

wherein the steps of generating the first plurality of successive images of the object and generating the second plurality of successive images include:

focusing light from the object such that the images generated in the generating steps are magnified versions of the object; and splitting the light from the object so that some light from the object forms the first plurality of successive images and so that other light from the surface is shifted such that it forms the second plurality of successive images that are offset a sub-pixel distance with respect to the first plurality of successive images; and processing the images together to produce a reconstructed image of the object such that the reconstructed image has a higher image quality than one of the plurality of successive images.

2. The method of claim 1, wherein generating a second plurality of successive images further includes splitting the light from the object so that the second plurality of successive images is offset a sub-pixel distance in a horizontal direction from the generating the first plurality of successive images.

3. The method of claim 1, wherein generating a second plurality of successive images further includes splitting the light from the object so that the second plurality of successive images is offset a sub-pixel distance in a vertical direction from the first plurality of successive images.

4. The method of claim 1, wherein generating a second plurality of successive images further includes splitting the light from the object so that the second plurality of successive images is offset a sub-pixel distance in a vertical direction and offset a sub-pixel distance in a horizontal direction from the first plurality of successive images.

5. The method of claim 1 wherein the step of generating a plurality of successive images includes splitting the light from the object so that at least three pluralities of successive images of the object are formed including a first plurality of successive images and at least two other pluralities of successive images and wherein the at least two other pluralities of successive images are offset a sub-pixel distance with respect to the first plurality of successive images.

* * * * *